United States Patent
Mirebeau et al.

(10) Patent No.: US 9,748,757 B2
(45) Date of Patent: Aug. 29, 2017

(54) ARRANGEMENT FOR CONNECTING A POWER CABLE TO AN EQUIPMENT ELEMENT

(75) Inventors: Pierre Mirebeau, Villebon S/Yvette (FR); Laurent Moreau, Longuenesse (FR); Martine Duvivier, Licques (FR)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 11/218,310

(22) Filed: Sep. 1, 2005

(65) Prior Publication Data

US 2006/0054345 A1    Mar. 16, 2006

(30) Foreign Application Priority Data

Sep. 3, 2004   (FR) ...................... 04 51966

(51) Int. Cl.
*H02G 15/30*    (2006.01)
*H02G 15/184*   (2006.01)
*H02G 15/188*   (2006.01)

(52) U.S. Cl.
CPC ......... *H02G 15/184* (2013.01); *H02G 15/188* (2013.01)

(58) Field of Classification Search
CPC .................................................... H02G 15/184
USPC .................... 174/74 R, 73.1, 88 R
See application file for complete search history.

(56) References Cited

U.S. PATENT DOCUMENTS

| | | | | | |
|---|---|---|---|---|---|
| 2,958,906 | A | * | 11/1960 | Youthed | 156/294 |
| 3,127,291 | A | * | 3/1964 | Betz et al. | 156/49 |
| 4,698,458 | A | | 10/1987 | Parmigiani | 174/73.1 |
| 4,714,800 | A | * | 12/1987 | Atkins et al. | 174/73.1 |
| 4,791,245 | A | * | 12/1988 | Thornley | 174/73.1 |
| 6,025,560 | A | * | 2/2000 | De Buyst et al. | 174/88 C |

FOREIGN PATENT DOCUMENTS

| | | | | |
|---|---|---|---|---|
| DE | 10114300 | * 10/2002 | | |
| EP | 0920102 | 6/1999 | ........... | H02G 15/105 |
| FR | 2685141 | 12/1991 | ............. | H02G 15/18 |
| FR | 2697665 | 10/1992 | ............... | H01B 7/02 |

OTHER PUBLICATIONS

French Search Report—Mar. 18, 2005.

* cited by examiner

*Primary Examiner* — Chau N Nguyen
(74) *Attorney, Agent, or Firm* — Sofer & Haroun, LLP

(57) ABSTRACT

In an arrangement for connecting a high-voltage or very-high-voltage power cable comprising an insulative external jacket to an equipment element comprising an external surface by means of an insulative layer, the insulative layer consists of a composite material resistant to traction in the longitudinal direction of the cable and attached to said external jacket and to the external surface.

7 Claims, 2 Drawing Sheets

ARRANGEMENT FOR CONNECTING A POWER CABLE TO AN EQUIPMENT ELEMENT

RELATED APPLICATION

This application is related to and claims the benefit of priority from French Patent Application No. 04 51966, filed on Sep. 3, 2004, the entirety of which is incorporated herein by reference.

BACKGROUND OF THE INVENTION

Field of the Invention

The invention relates to an arrangement for connecting a high-voltage or very-high-voltage power cable to an equipment element.

Description of the Prior Art

A power cable includes, around a conductor, from the inside toward the outside, an insulative layer, a semiconductor layer, a metal shield and an insulative external jacket.

To connect a power cable to an equipment element, for example a cable splicing element or a cable termination element, the external jacket is removed over a certain length, a welded joint is effected between the metal shield of the cable and a metal shield of the equipment element, and a connection element is disposed between the cable and the equipment element with one of its ends in contact with the external jacket of the cable and its other end in contact with the external surface of the equipment element.

The connection element includes a length of heat-shrink sleeve applied longitudinally in this way between the external jacket of the cable and the external surface of the equipment element. A layer of mastic is conventionally disposed radially between this length of heat-shrink sleeve and the elements consisting of the metallic shield of the cable, the external surface of the equipment element and the welded joint.

The above kind of connection arrangement gives rise to the following technical problem.

The insulative external jacket of the cable is traditionally extruded. Because of this mode of fabrication, it has a greater capacity for shrinkage than a molded sleeve. Moreover, high-voltage and very-high-voltage cables carrying large amounts of energy, and which are therefore heavy, are made from a high-density elastomer material, for example high-density polyethylene, which by virtue of its composition has a greater capacity for shrinkage than a low-density or medium-density elastomer material.

Following shrinkage of the external jacket of the cable, which may entail forces of several tonnes, the external jacket may become detached from the connection arrangement and the metal shield of the cable may be exposed, which compromises correct electrical operation following the loss of insulation. The ability of the metal shield to withstand voltages and lightning strikes is therefore reduced.

This shrinkage of the external jacket of the cable may also damage clamp type cable retaining arrangements in which intermediate layers of neoprene intended to absorb radial expansion may escape from the clamp, because the coefficient of friction between neoprene and polyethylene is higher than that between neoprene and the metal of the clamp.

The invention solves this shrinkage problem by proposing an arrangement for connecting a high-voltage or very-high-voltage power cable to an equipment element that retains the insulative external jacket of the cable against shrinkage forces inherent to its construction.

SUMMARY OF THE INVENTION

To this end, the invention proposes an arrangement for connecting a high-voltage or very-high-voltage power cable comprising an insulative external jacket to an equipment element comprising an external surface by means of an insulative layer which consists of a composite material resistant to traction in the longitudinal direction of the cable and attached to said external jacket and to said external surface.

Advantageously, a length of heat-shrink material sleeve is disposed over said insulative layer but the insulative layer may instead of itself provide the connection and be used as an essential component of the connection arrangement.

In a first preferred embodiment of the invention, said composite material consists of fibers disposed substantially in the longitudinal direction of the cable embedded in a resin.

In a second preferred embodiment of the invention, said composite material consists of a plurality of layers of fibers crossing over each other in the longitudinal direction of the cable and buried in a resin.

Said composite material preferably consists of woven glass fibers and a resin.

Said composite material advantageously consists of a tape of woven glass fibers wrapped around the cable and the equipment element embedded in an epoxy resin.

The attachment of said layer to the external jacket of the cable is preferably effected by melting the surface of said sleeve and applying said layer.

The attachment of said layer to the external jacket of the cable is advantageously effected by melting the surface of said sleeve, applying said woven tape thereto, and applying said resin.

If the equipment element comprises an external surface of insulative material, for example in the case of a cable splicing element with a plastics material insulative coating, the attachment of said layer to said external surface of the equipment element may be effected by melting the surface of said surface and applying said layer.

If the equipment element comprises an external surface of metal, for example in the case of a cable terminating element with a metal cap, the attachment of said layer to said external surface of the equipment element may be effected by welding on a metal element with anchoring protuberances and applying said layer.

The invention is described in more detail hereinafter with the aid of figures representing a preferred embodiment of the invention.

DETAILED DESCRIPTION OF THE PREFERRED EMBODIMENTS

A high-voltage or very-high-voltage power cable 1 includes, around a conductor 1A, from the inside toward the outside, an insulative layer 1B, a semiconductor layer 1C, a metal shield iD and an insulative external jacket 1E.

Figure 1:
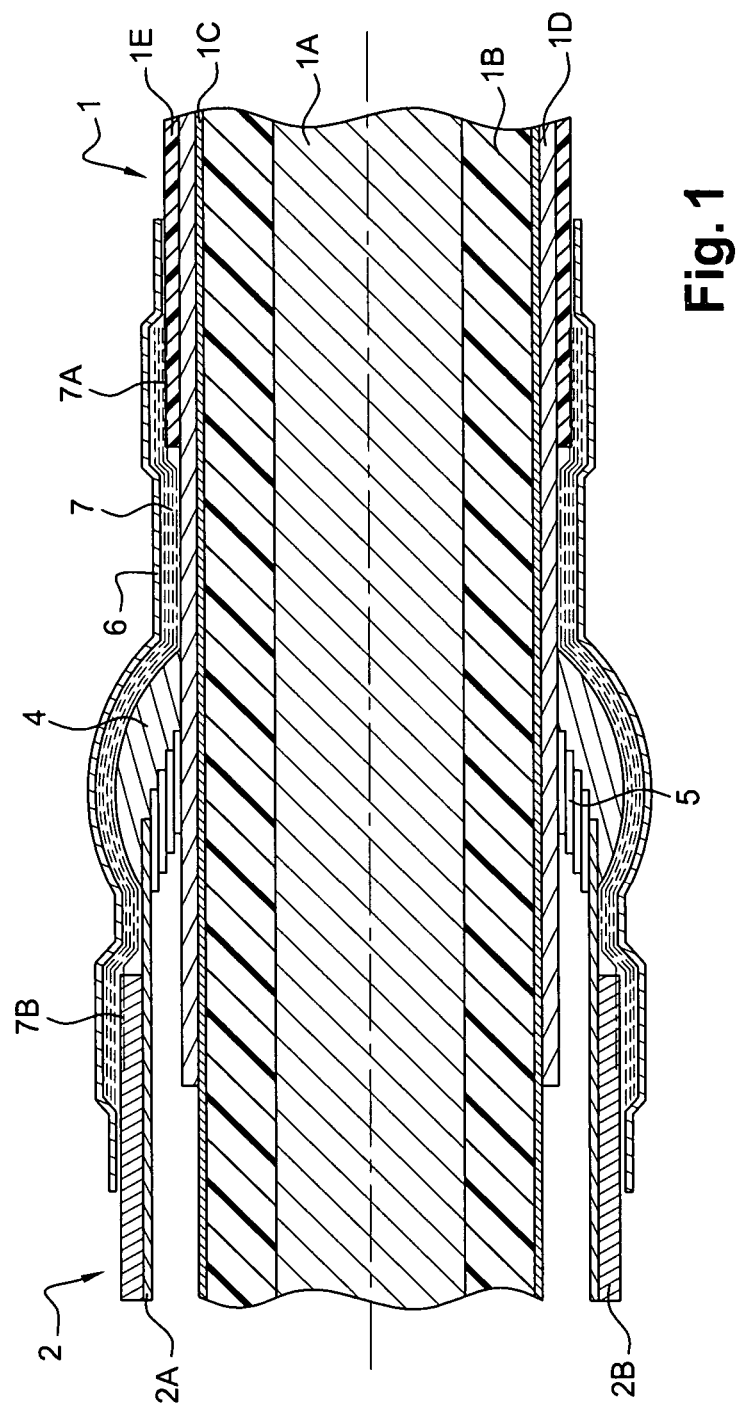
FIG. 1 is a view in longitudinal section of an arrangement for connecting a high-voltage or very-high-voltage power cable to a cable splicing element.
Figure 2:
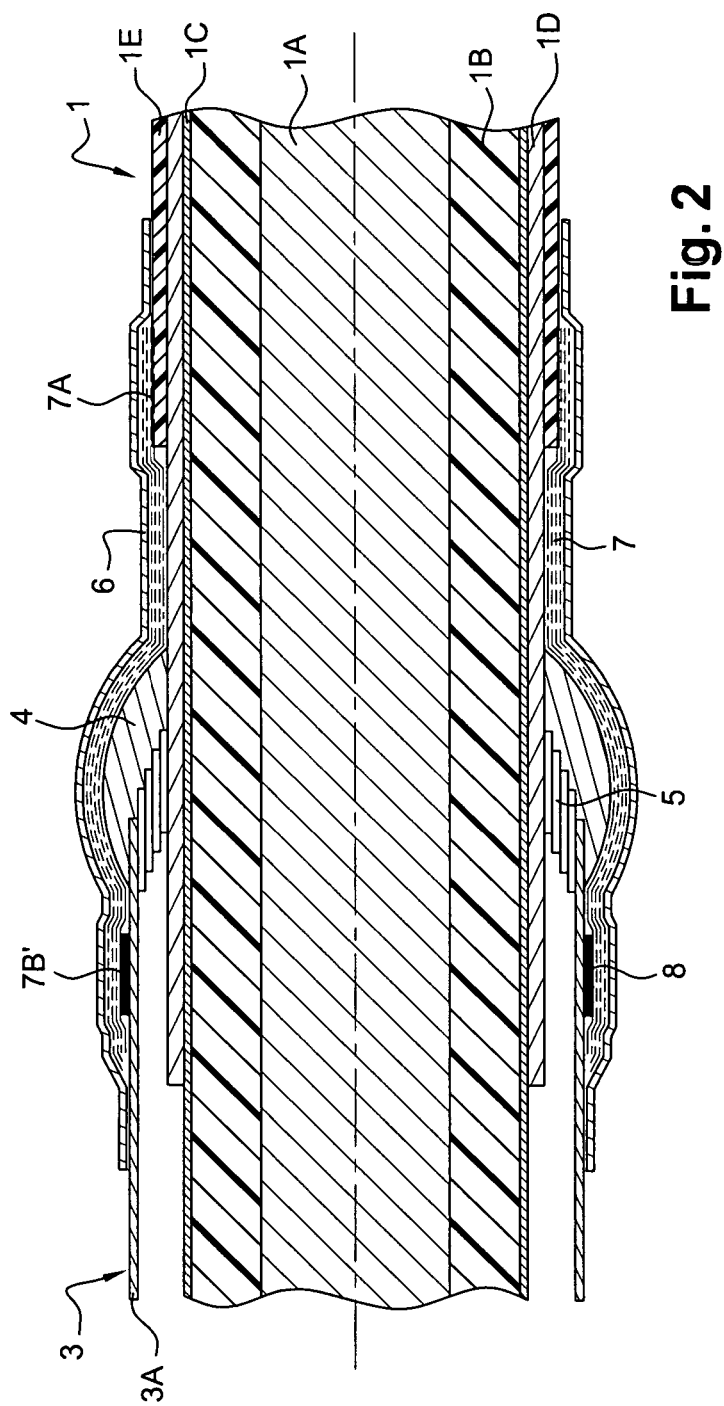
FIG. 2 is a view in longitudinal section of an arrangement for connecting a high-voltage or very-high-voltage power cable to a cable termination element.

For its connection to an equipment element, for example to a cable splicing element 2 as shown in FIG. 1 or to a cable termination element 3 as shown in FIG. 2, the external jacket 1E is removed over a certain length, a welded joint 4 is effected with the aid of interleaved plates 5 between the metal shield 1D of the cable and a metal shield 2A, 3A of the equipment element 2, 3, and a connection element is disposed between the cable 1 and the equipment element 2, 3, having one of its ends in contact with the external jacket 1E of the cable and its other end in contact with the external surface of the equipment element 2, 3.

The connection element includes a length of heat-shrink sleeve 6 applied longitudinally in this way between the external jacket 1E of the cable and the external surface of the equipment element 2, 3 and an insulative layer 7 is conventionally disposed radially between this length of sleeve 6 and the external jacket 1E of the cable, the external surface of the equipment element 2, 3 and the welded joint 4.

According to the invention, this layer 7 consists of a composite material resistant to traction in the longitudinal direction of the cable and attached to the external jacket 1E of the cable and to the external surface of the equipment element 2, 3.

The composite material of the insulative layer 7 consists of fibers disposed substantially in the longitudinal direction of the cable 1 embedded in a resin and is preferably made up of woven glass fibers and a resin. One embodiment of the composite material consists of a tape of woven glass fibers wrapped around the cable 1 and the equipment element 2, 3, buried in an epoxy resin.

The attachment 7A of this layer 7 to the external jacket 1E of the cable is effected by melting the surface of the external jacket 1E of the cable and applying the layer 7.

In one embodiment, the surface of the external jacket 1E of the cable is melted with a torch, the tape of woven glass fibers is wrapped over the molten material of the sleeve 1E, and at substantially the same time the epoxy resin is applied to the tape with a brush.

If the equipment element comprises an external layer 2B of insulative material, for example in the case of a cable splicing element 2 as shown in FIG. 1, the attachment 7B of the composite layer 7 to this external layer 2B of the equipment element is effected in the same way, by melting the surface of the external layer 2B and applying the composite layer 7.

If the equipment element comprises an external metal external jacket 3A, for example in the case of the cap of a cable termination 3 as shown in FIG. 2, the attachment 7B' of the composite layer 7 to the external jacket 3A of the equipment element is effected by welding on a metal element 8 with anchoring protuberances and applying the composite layer 7.

One embodiment of the metal element 8 is welded to the external jacket 3A of the cap, the woven glass fiber tape is wrapped over the external metal jacket 3A, and at substantially the same time the epoxy resin is applied to the tape with a brush, the attachment being effected by the anchoring of the protuberances in the tape and the resin.

An arrangement in accordance with the invention for connecting a high-voltage or a very-high-voltage power cable to an equipment element resists the forces arising from shrinkage of the external jacket of the cable, which may be as high as several tonnes and are amplified by the self-weight of the conductor, which is particularly high at these voltage levels.

There is claimed:

1. An arrangement for connecting a high-voltage or very-high-voltage power cable to an equipment element comprising:
    an insulative external jacket of a power cable made from a thermoplastic material;
    an equipment element, having an external surface to which the arrangement is being attached; and
    an insulative layer,
    wherein said insulative layer is heat shrinkable and is configured to compress onto an outer surface of said insulative external jacket of said cable and to hold a separate composite material therebetwen against the inside surface thereof, said composite material being resistant to traction in the longitudinal direction of said cable,
    wherein said insulative layer and said separate composite material are attached to said insulative external jacket of said cable on one side of a connection point and to said external surface of said equipment element on the other side of said connection point, said insulative layer attached to said external surface of said equipment element by melting the external surface of said equipment element and applying said insulative layer,
    wherein the attachment of said insulative layer and said separate composite material to said external jacket of said cable is such that a melted portion of an outer surface of said insulative external jacket of said cable couples with said composite material and is held by a heat shrunken said insulative layer, sufficient to suppress separation effects on said arrangement caused by skrinkage of said insulative external jacket of said cable.

2. The arrangement claimed in claim 1, wherein said composite material includes fibers disposed substantially in the longitudinal direction of said cable and embedded in a resin.

3. The arrangement claimed in claim 2, wherein said composite material includes of woven glass fibers and a resin.

4. The arrangement claimed in claim 3, wherein said composite material includes of a tape of woven glass fibers wrapped around the cable and the equipment element and embedded in an epoxy resin.

5. The arrangement claimed in claim 4, wherein the attachment of said insulative layer to said external jacket of said cable is affected by melting the surface of said jacket, applying said woven tape thereto and applying said resin.

6. The arrangement claimed in claim 1, wherein said composite material includes a plurality of layers of fibers crossing over each other in the longitudinal direction of said cable and buried in a resin.

7. The arrangement claimed in claim 1 for connecting a high-voltage or very-high-voltage power cable to an equipment element having an external surface of metal, wherein the attachment of said insulative layer to said external surface of said equipment element is effected by welding on the external surface of a metal element with anchoring protuberances and applying said insulative layer.

* * * * *